Feb. 19, 1935.  J. H. STERNBERGH  1,991,636
DIE HEAD
Filed Oct. 14, 1932
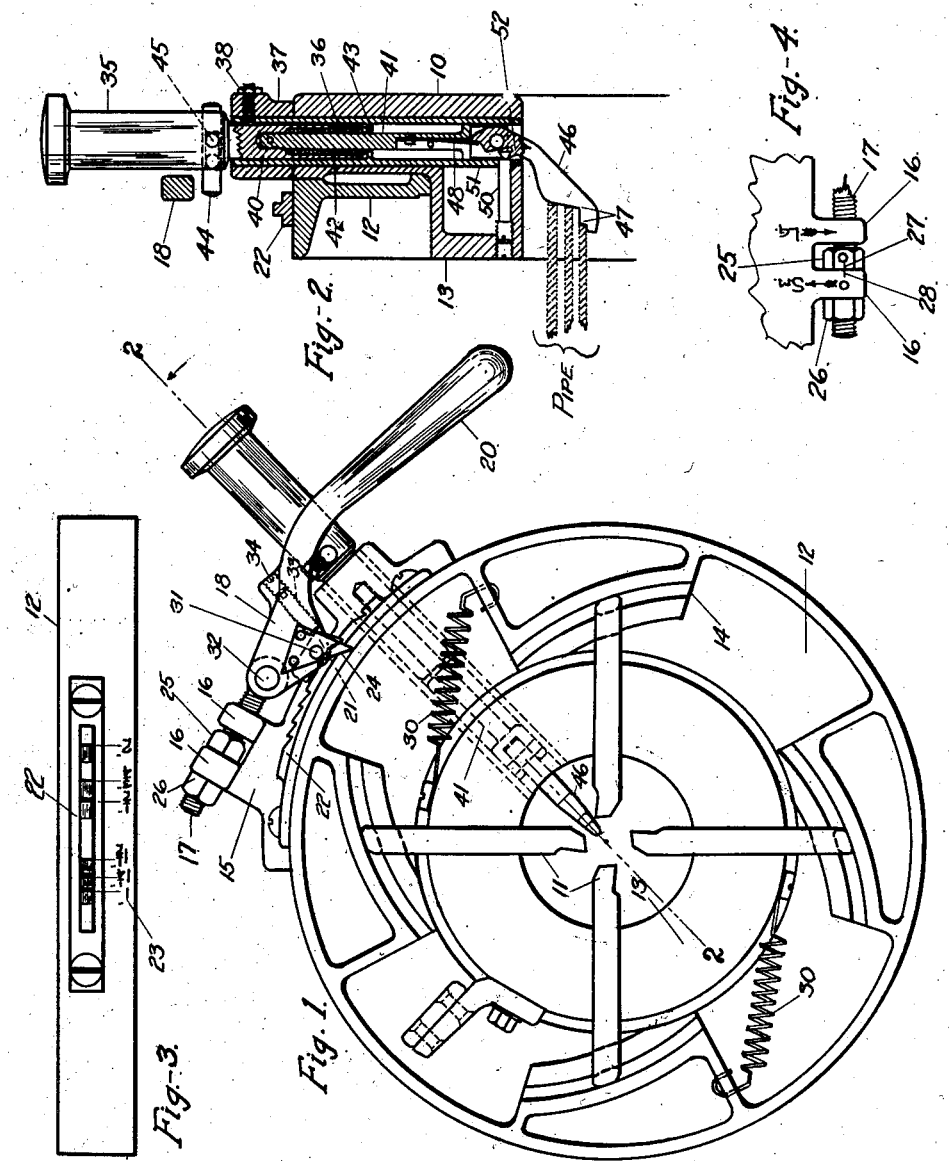
James Hervey Sternbergh
INVENTOR
BY
ATTORNEYS Patented Feb. 19, 1935

1,991,636

UNITED STATES PATENT OFFICE 1,991,636

DIE HEAD

James Hervey Sternbergh, Reading, Pa.

Application October 14, 1932, Serial No. 637,674

10 Claims. (Cl. 10—96)

My invention relates to improvements in die heads for that type of machine in which several sizes of pipe may be threaded without changing chasers for the different sizes of pipe. The invention relates more particularly to an arrangement whereby the chasers may be quickly adjusted in position for threading different pipe sizes and automatically released when the proper length thread has been cut.

Referring to the drawing which is hereby made a part hereof and on which similar reference characters indicate similar parts;

Fig. 1 is a front elevation of the die head;

Fig. 2 is a sectional view taken on the line 2—2 in Fig. 1;

Fig. 3 is a plan view of the cam ring showing a graduated rack thereon, and

Fig. 4 is a fragmentary plan view of a portion of a micrometric adjusting means for the chasers.

In the drawing, the numeral 10 designates a die head body which may be carried by the reciprocatory carriage of a pipe threading machine and which has a set of threading chasers 11 slidably mounted in radial slots in the die head. A cam ring 12 mounted for oscillation on a hub 13 of the die head is provided with arcuate ribs or cam grooves 14 acting in well known manner upon the chasers to move the latter inwardly or outwardly as the cam ring is rotated on the relatively stationary die head.

A bracket 15 secured to body 10 is provided with spaced lugs 16 to receive an adjustable stud 17 on which a lever 18 having a handle portion 20 is pivotally mounted. Lever 18 carries a pivoted pawl 21 which is adapted to engage teeth on an arcuate segment or rack 22 mounted on the cam ring 12 for holding the latter in various rotated positions to which it may be moved by any suitable form of turning device. As shown in Fig. 3 the rack 22, or the cam ring adjacent the rack, is provided with a graduated scale 23 movable beneath and cooperating with a pointer 24 carried by lever 18 for indicating the proper rotative setting of cam ring 12 relatively to die head body 10 to cut threads on different sizes of pipe represented by the scale markings.

In Figs. 1 and 4 the numeral 25 designates a multi-sided nut carried by stud 17 and operable for advancing or retracting the stud in lugs 16 to effect a fine adjustment of the position of pawl 21 in order to micrometrically position the chasers for cutting slightly larger or smaller threads on the work than the sizes indicated by the scale graduations adjacent the rack teeth. A lock nut 26 is provided for maintaining the adjustment. As shown in Fig. 4 one side of nut 25 is provided with an index mark 27 cooperating with similar marks 28 on lugs 16 to indicate the normal adjustment of pawl 21 for cutting the standard sizes indicated on scale 23.

The arrangement may be such that for each turning movement of nut 25 to present a different side of nut 25 in registration with indices 28 the adjustment effected in the position of pawl 21 results in cutting threads of such size as to permit a fitting to be manually turned on the pipe thread one half turn, for example, more or less than would be the case with standard threading.

From the foregoing description it may be seen that by rotating cam ring 12 until the scale marking on rack 22 designating the pipe size to be threaded is located in alinement with pointer 24 on lever 18 the chasers 11 are properly set to thread the pipe and pawl 21 carried by lever 18 engages teeth of rack 22 on ring 12 to lock the latter and the chasers in their adjusted position. A spring 30 connected to body 10 and cam ring 12 is provided for reversely rotating the ring to withdraw the chasers on disengagement of pawl 21 from rack 22 by raising lever 18 either manually or automatically as hereinafter described. In order that pawl 21 may properly engage the teeth of rack 22 and also to insure that the force of spring 30 does not act through the rack on the pawl to disturb the nicety of adjustment, the pawl is arranged so that its nose is operatively positioned slightly above a center line passing through its pivot 31 and the pivot 32 for lever 18. To this end the pawl is suitably biased preferably by counterweighting and an adjustable stop 33, and lock screw 34 therefor, are provided in a bore of lever 18 for cooperating with the pawl.

The automatic release mechanism for pawl 21 and lever 18, and hence for the chasers 11, comprises a plunger 35 slidable in a sleeve 36 mounted in a radial bore in die head body 10 and an alined bore in a boss 37 on bracket 15. Suitable means are provided for securing sleeve 36 and for preventing rotation of plunger 35, such for example as a set screw 38 extending through boss 37, sleeve 36 and engaging a key way formed in plunger 35. Plunger 35 comprises an upper portion 40 formed with a bore within which is secured a stem 41 surrounded by a coiled spring 42 mounted between the base of the bore and an annular shoulder 43 on sleeve 36. Spring 42 acts to bias plunger 35 to raised position for causing a stud 44 carried thereby to engage and operate lever 18 to release pawl 21 and permit spring 30 to effect retraction of the chasers. As shown in Fig. 2 stud 44 is movable transversely of plunger 35 to and from operative position relatively to lever 18 and a ball detent 45 is provided for holding the stud in either position.

At its lower end the stem 41 is enlarged and counter bored for pivotally mounting a work engaging trip or finger 46 extending into the bore of the die head. Finger 46 has a stepped face 47 suitably formed to be engaged by the end of any size pipe within the capacity of the head for causing retraction of the chasers when the standard length thread is completed. A spring 48 biases the finger about its fulcrum to work engaging position and, when the plunger 35 is depressed, into engagement with a locking latch or pin 50 mounted in the die head body and extending through a slot 51 in the plunger into engagement with a shoulder 52 on finger 46 for locking the plunger in depressed position.

In operation plunger 35 is depressed and locked so by the engagement of locking pin 50 with finger 46. Cam ring 12 is rotatably adjusted to position for causing of cutting threads on the size pipe being worked upon and is locked in said position by engagement of pawl 21 with the corresponding tooth of rack 22. When the proper length of thread has been cut the end of the pipe acting on finger 46 disengages the latter from pin 50 whereupon plunger 35 is released and is moved outwardly by spring 42. Stud 44 carried by the plunger engages and raises lever 18 moving pawl 21 out of engagement with rack 22 and spring 30 then is free to reversely rotate cam ring 12 and effect retraction of the chasers. The operation may later be repeated on other pipe; if of the same size by setting cam ring as before and if of a different size by setting cam ring so that pointer 24 aligns with the corresponding scale mark, either setting operation being readily and quickly effectable without the use of tools.

For cutting threads of unusual length the automatic releasing device described above may be rendered temporarily inactive by moving stud 44 in plunger 35 to its inoperative position relatively to lever 18 so that it is unnecessary to depress plunger 35 for permitting pawl 21 to operatively engage rack 22. Cam ring 12 is then adjusted for the proper pipe size and is locked as before by pawl 21. The cutting operation may then be terminated at any desired time by raising lever 18 manually.

Although an illustrative embodiment of my invention has been described in detail it is to be understood that there are many changes and variations which may be made without departing from the principles of my invention and, therefore, I desire to include all such changes and variations within the scope of the appended claims.

What I claim is:

1. In a die head having a body, chasers thereon and means including a member movable relatively to said body for moving the chasers into and out of operative position; a pawl carried by the body; a toothed rack mounted on and movable with said member for selectively engaging teeth of the rack with said pawl to lock the chasers in various operative positions; work controlled means cooperating with said pawl to disengage the latter from said rack; and means connected to said body and said member for operating the latter to move said chasers to inoperative position.

2. In a die head having a body, chasers thereon and means including a member movable relatively to said body for moving the chasers into and out of operative position; a lever mounted on said body; a pawl carried by said lever; a toothed rack mounted on and movable with said member for selectively engaging teeth of said rack with said pawl to lock the chasers in various operative positions; automatic work controlled means for actuating said lever to disengage said pawl from said rack; and means operative on disengagement of said pawl for operating said member to move the chasers to inoperative position.

3. In a die head having a body, chasers thereon and means including a member movable relatively to said body for moving the chasers into and out of operative position; a lever mounted on said body; a pawl carried by said lever; a toothed rack mounted on and movable with said member for selectively engaging teeth of said rack with said pawl to lock the chasers in various operative positions; a depressible plunger mounted in said body; means associated with said plunger for biasing the latter to raised position; work releasable latching means for holding said plunger in depressed position; and a stud mounted in said plunger and adapted on raising thereof to operate said lever for disengaging said pawl from said rack, said stud being movable out of operative relation to said lever to enable said pawl to remain in locking engagement with said rack.

4. In a die head having a body, chasers thereon and means including a member movable relatively to said body for moving the chasers into and out of operative position; a lever mounted on said body; a pawl carried by said lever; a toothed rack mounted on and movable with said member for selectively engaging teeth of said rack with said pawl to lock the chasers in various operative positions; a depressible plunger mounted in said body; means associated with said plunger for biasing the latter to raised position; work releasable latching means for holding said plunger in depressed position; and a stud mounted in said plunger adapted on raising of said plunger to operate said lever for disengaging said pawl from said rack and movable with said plunger on depression thereof to permit said lever to move said pawl into position to engage said rack, said stud being movable in said plunger to inoperative position relatively to said lever for enabling movement of said lever to engage said pawl with said rack without effecting depression of said plunger.

5. In a die head having a body, chasers mounted thereon and means including a member movable relatively to said body for moving the chasers into and out of operative positions; a depressible plunger mounted in said body; a rack mounted on said member; a pawl adapted to engage said rack to lock said member in position relatively to said body for retaining said chasers in an operative position; a lever mounted on said body and carrying said pawl, said lever being movable, on depression of said plunger, to engage said pawl with said rack; a finger pivotally carried by said plunger and positioned on depression thereof in the path of the work for actuation thereby; latching means engageable with said finger to hold said plunger in depressed position; means for moving said plunger to raised position on actuation of said finger by the work to disengage said latch; means carried by said plunger for actuating said lever on raising of said plunger to unlock said member; and means for actuating said member to move the chasers to inoperative position.

6. In a die head having a body, chasers thereon and means including a member movable relatively to said body for moving them into and out of operative position; complementary locking means carried by said body and member for locking said member to retain said chasers in operative positions; a depressible plunger mounted in the die head body; means carried by said plunger and adapted to unlock said locking means; a pivoted finger carried by said plunger and adapted on depression thereof to be positioned in the path of the work; a latching pin engageable with said finger to hold said plunger in depressed position, said finger being disengaged from said pin by the work; and means associated with said plunger for moving the latter to raised position for causing unlocking of said locking means.

7. In a die head having a body, chasers mounted thereon and means including a cam ring for moving them into and out of operative position, a toothed rack mounted on said cam ring; a lever mounted on the die head body; a pawl carried by said lever and engageable with the teeth of said rack for locking said chasers in operative position; a depressible plunger mounted in the die head body; a stud carried by said plunger for operating said lever to release said pawl from engagement with said rack; a pivoted finger carried by said plunger and adapted on depression thereof to be positioned in the path of the work; latching means cooperating with said finger to lock said plunger in depressed position, said finger being unlatched by the work on completion of the working operation; means operative on unlatching of said finger to actuate said plunger for causing disengagement of said pawl from said rack; and means associated with the body and cam ring for actuating the latter to move said chasers to inoperative position.

8. In a die head having a body, chasers thereon and means including a member movable relatively to said body for moving the chasers into and out of operative position; a pawl carried by the body; and a toothed rack mounted on and movable with said member for selectively engaging teeth of the rack with said pawl to lock the chasers in various operative positions.

9. In a die head having a body, chasers thereon, and means including a member relatively movable to said body through a plurality of selective positions for adjustably moving said chasers into varying operative positions; complementary means carried by said body and member adapted to lock said member in any selected position during its relative movement so as to retain said chasers in the operating position corresponding to such selected position of the movable member; work-actuated means operative to predeterminedly release said movable member from any of its locked positions; and means operable to disconnect said releasing means from acting.

10. In a die head having a body, chasers thereon, and means including a member freely movable relatively to said body through a plurality of selective positions for adjustably moving said chasers into varying operative positions; and complementary locking means carried by said body and member, one of which complementary means has a series of locking stops in the path of movement of the other complementary means, and the latter being adapted to be selectively lockingly engaged with any one of said series of stops during its movement across them so as to retain said chasers in the operating position corresponding to the locked position of the movable member.

JAMES HERVEY STERNBERGH.